(12) United States Patent
Cwik et al.

(10) Patent No.: US 10,580,191 B2
(45) Date of Patent: Mar. 3, 2020

(54) PROCEDURAL TERRAIN GENERATION SYSTEMS AND RELATED METHODS

(71) Applicant: Apple Inc., Cupertino, CA (US)

(72) Inventors: James J Cwik, Mountain View, CA (US); Timothy R. Oriol, San Jose, CA (US); Ross R. Dexter, Santa Clara, CA (US); Bruno M. Sommer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 15/216,575

(22) Filed: Jul. 21, 2016

(65) Prior Publication Data

US 2017/0358122 A1 Dec. 14, 2017

Related U.S. Application Data

(60) Provisional application No. 62/349,085, filed on Jun. 12, 2016.

(51) Int. Cl.
*G06T 15/04* (2011.01)
*G06T 15/10* (2011.01)
*G06T 17/05* (2011.01)
*G06T 11/00* (2006.01)

(52) U.S. Cl.
CPC .............. *G06T 15/04* (2013.01); *G06T 11/00* (2013.01); *G06T 15/10* (2013.01); *G06T 17/05* (2013.01)

(58) Field of Classification Search
CPC .................................. G06T 15/04; G06T 15/10
See application file for complete search history.

(56) References Cited

U.S. PATENT DOCUMENTS

| 7,728,837 B2 | 6/2010 | Szymanski et al. |
| 8,953,872 B2 | 2/2015 | Shin et al. |
| 9,183,666 B2 | 11/2015 | Kontkanen |

(Continued)

FOREIGN PATENT DOCUMENTS

CA 2617373 10/2003

OTHER PUBLICATIONS

Ian Parberry ("Designer Worlds: Procedural Generation of Infinite Terrain from Real-World Elevation Data" Journal of Computer Graphics Techniques vol. 3, No. 1, 2014).*

(Continued)

*Primary Examiner* — Barry Drennan
*Assistant Examiner* — Khoa Vu
(74) *Attorney, Agent, or Firm* — Ganz Pollard, LLC

(57) ABSTRACT

Systems and techniques for generating an artificial terrain map can select a plurality of component terrains for each of several terrain types. Values of a selection noise map ranging between a lower bound and an upper bound can be computed on a tile-by-tile basis. One or more noise bands within the range of selection-noise-map values can correspond to each terrain type. The noise map can be sampled on a tile-by-tile basis to determine a tile value for each tile. Each respective tile can be assigned to the noise band in which the tile value falls. A terrain value can be assigned to each respective tile in the selection noise map based on the noise band assigned to the respective tile. Generated maps in machine-readable form can be converted to a human-perceivable form, and/or to a modulated signal form conveyed over a communication connection.

21 Claims, 9 Drawing Sheets

(56) References Cited

U.S. PATENT DOCUMENTS

| | | | |
|---|---|---|---|
| 9,208,601 B2 | 12/2015 | Pirwani | |
| 2005/0253843 A1* | 11/2005 | Losasso Petterson | ........................ |
| | | | G06T 15/10 |
| | | | 345/428 |
| 2007/0206023 A1* | 9/2007 | Street ...................... | A63F 13/10 |
| | | | 345/582 |
| 2009/0157566 A1* | 6/2009 | Grush .................... | G01C 21/28 |
| | | | 705/400 |
| 2013/0169629 A1* | 7/2013 | Shin ........................ | G06T 15/04 |
| | | | 345/419 |
| 2015/0348284 A1* | 12/2015 | Bradbury ................ | G06T 15/04 |
| | | | 345/419 |

OTHER PUBLICATIONS

Parberry ("Designer Worlds: Procedural Generation of Infinite Terrain from Real-World Elevation Data" Journal of Computer Graphics Techniques vol. 3, No. 1, 2014 (Year: 2014).*

* cited by examiner

PROCEDURAL TERRAIN GENERATION SYSTEMS AND RELATED METHODS

RELATED APPLICATIONS

This application claims benefit of and priority to U.S. Provisional Patent Application No. 62/349,085, filed on Jun. 12, 2016, which application is hereby incorporated by reference in its entirety for all purposes.

BACKGROUND

This application, and the innovations and related subject matter disclosed herein, (collectively referred to as the "disclosure") generally concern systems for procedurally generating maps of artificial terrain from noise maps, and associated techniques. More particularly but not exclusively, disclosed systems and associated techniques pertain to generating terrain maps on a tile-by-tile basis from smoothly varying noise. As but one example, disclosed systems and techniques can generate a composite terrain map on a tile-by-tile basis from a base (or selection) noise map and a selected plurality of one or more terrain images, one or more gradients, and/or one or more other noise maps. Some disclosed systems can retain full-scale details of composited gradients and other noise maps. As well, some disclosed systems can load visible portions of a terrain map, and adjacent buffered portions of the terrain map, into active memory to efficiently allow continuous rendering of terrain as a player navigates past an edge of visible terrain.

By way of background, noise maps can be used to generate artificial terrain as for games. A noise map, generally, is a collection of randomly or pseudo-randomly selected numbers. Noise maps can have one or more dimensions. For example, a one-dimensional array populated with a collection of randomly or pseudo-randomly selected numbers constitutes a 1-D noise map, a two dimensional matrix populated with a collection of randomly or pseudo-randomly selected numbers constitutes a 2-D noise map, etc.

Noise maps having adjacent entries correlated with each other can ensure a smooth variation within the noise map. Such smoothly varying noise maps can be particularly well-suited for use in generating artificial terrain maps, as for games, and generally are referred to in the art as being "coherent". As but one example of generating terrain from a noise map, each value in a one-dimensional (1-D) noise map can be scaled to correspond to a height. Thus, a 1-D noise map can be used to generate a cross-sectional hill profile, or a two-dimensional (2-D) noise map can be used to generate mountains and valleys in three-space.

Some games provide a 2-D plan view of terrain, as from above (e.g., as indicated by the contours in FIG. 9). Many such games assemble a mosaic of standard tiles, or standard-sized images, over a visible playing area to generate a map of terrain. For example, a collection of various shades of blue tiles can be assembled together to illustrate a region of water. A collection of various shades of brown and beige tiles can be assembled together to illustrate a region of sand, dirt, or other arid region. Similarly, a collection of various shades of green tiles can be assembled together to illustrate a region of forest, or grass.

A so-called "tile set" generally refers to a collection of tiles available to use in a mosaic to generate a terrain map. Complex tile maps can be created even when reusing tiles within a given set, yet the ability to reuse tiles within a set can reduce the amount of system memory required to generate and/or display a map since tiles can be reused multiple times. Tile maps can also reduce the amount of artwork needed for a given map in relation to generating a comprehensive map, since many different tile maps can be created from a single tile set. However, assembling a mosaic of tiles can be difficult and time consuming.

Thus, a need remains for computationally efficient systems and associated techniques to procedurally generate terrain maps. As well, a need remains for approaches for procedurally generating terrain maps with small amounts of stored data.

SUMMARY

The innovations disclosed herein overcome many problems in the prior art and address one or more of the aforementioned or other needs. In some respects, the innovations disclosed herein generally concern systems and associated techniques for procedurally generating terrain maps, and more particularly, but not exclusively to generating two-dimensional (2-D) terrain maps from one or more noise maps. For example, some disclosed systems and techniques can populate a tile map based on a 2-D noise map, and other disclosed systems and techniques can generate a terrain map by combining a base noise map with one or more other noise maps or gradients representative of one or more corresponding terrain types.

In a computationally efficient method of generating an artificial terrain map, a plurality of terrain types can be selected, and a component terrain can be provided for each of the terrain types. A region of a selection noise map can be computed on a tile-by-tile basis, and the selection noise map can have values ranging between a lower bound and an upper bound. One or more noise bands can be defined within the range of selection-noise-map values corresponding to each terrain type. Each respective noise band can have a corresponding lower bound and an upper bound. The noise map can be sampled at a selected rate on a tile-by-tile basis to determine a tile value for each tile, and each respective tile can be assigned to one of the noise bands. For example, the tile value can fall within the range of the assigned noise band. A terrain value can be assigned to each respective tile in the selection noise map based on the noise band assigned to the respective tile.

In some circumstances, the terrain value can be one of a gradient, another noise map, a terrain type, and a color.

In those and other circumstances, the terrain value can be a discrete function or a continuous function, and the respective function can range between a lower bound and an upper bound. The range of the respective function can be scaled to match the range of the corresponding band. In some instances, assigning a terrain value to the noise-map tile can include determining a value within the range of the respective function to correspond with the tile value within the range of the respective noise band.

The terrain value can be a terrain type, and disclosed methods can also include selecting a tile representative of the terrain type. In such systems a position of the tile representative of the terrain type can occupy a selected position within a terrain map, and the selected position within the terrain map can correspond to a position of the noise map tile within the noise map.

A noise-map tile size and the selected sampling rate can each be selectable.

The act of computing the noise map on the tile-by-tile basis can include computing a noise map value for each tile within a selected visible region and within a selected buffer region positioned adjacent the selected visible region.

Artificial terrain generators also are disclosed. Such a generator can include a noise-map generator configured to generate coherent noise within a given range on a tile-by-tile basis. A terrain generator can be configured to determine a noise value of each tile based on a selected number of noise samples from each tile. The generator can also be configured to divide the range of the coherent noise into a selected plurality of noise bands. As well, each band can correspond to a selected terrain value and extend between a lower threshold and an upper threshold. A tile mapper can be configured to assign a selected terrain representation to each tile in the noise map in correspondence with the terrain value.

The tile generator can also be configured to generate a first plurality of tiles corresponding to a display region and a second plurality of tiles corresponding to a buffer region. The buffer region can be positioned around an outer periphery of the display region.

Artificial terrain generators can also, but need not, include a renderer configured to asynchronously prepare to load one or more of the second plurality of tiles corresponding to the buffer region into a memory to display the respective one or more of the second plurality of tiles. Such a renderer can also be configured to delete from memory tiles that exit the buffer region.

The selected terrain representation can be one of a gradient, a terrain type, a color, and another noise map.

Such a gradient or other noise map can have a measure ranging between a lower bound and an upper bound. As well, each band can have a lower bound and an upper bound, and the tile mapper can be further configured to scale the range of the gradient or other noise map to match the range of the corresponding band. Moreover, some the tile mappers are configured also to determine a position within the range of the gradient or other noise map to correspond with a position of the tile value within the range of the respective band corresponding to the gradient or other noise map.

When the terrain value constitutes a terrain type, some tile mappers can select a tile from a terrain map having a position corresponding to a position in the noise map.

Also disclosed are tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

In some instances, resulting terrain maps can be rendered into a human-perceivable form, and/or transformed into a modulated signal conveyed over a communication connection.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

Figure 1:
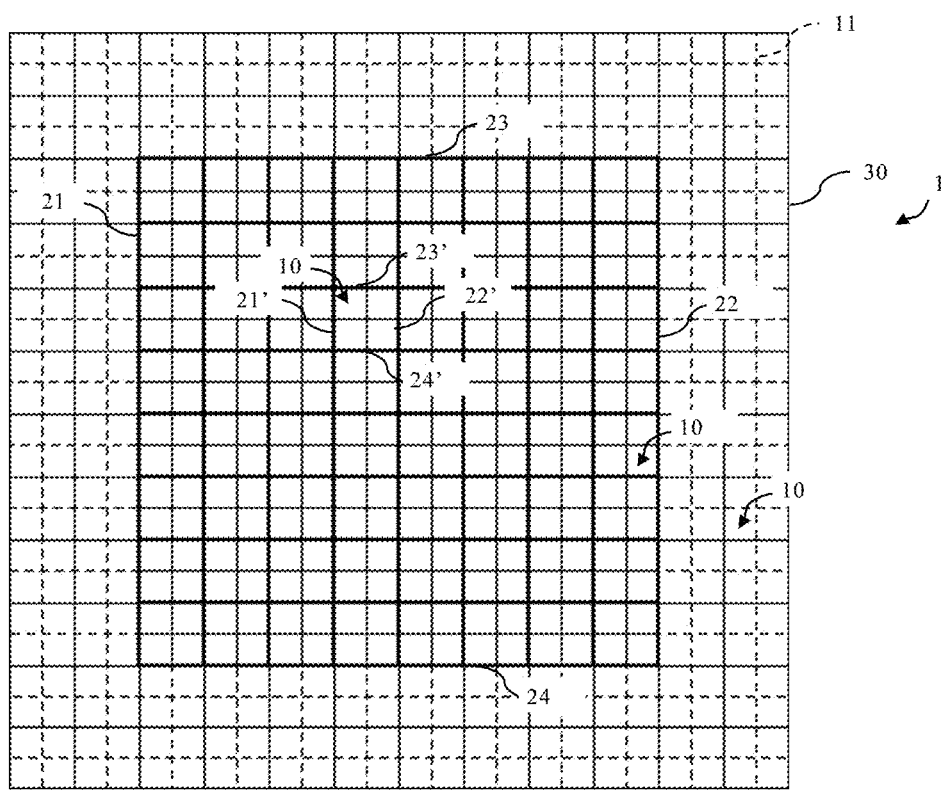
FIG. 1 illustrates a noise map spanning a visible region and a buffer region.

The following describes various innovative principles related to systems for procedurally generating maps of artificial terrain from noise maps, and associated techniques, by way of reference to specific system embodiments. For example, certain aspects of disclosed subject matter pertain to systems and techniques for generating terrain maps on a tile-by-tile basis from smoothly varying noise, and more particularly but not exclusively, from a base noise map and a selected plurality of one or more terrain images, one or more gradients, and/or one or more other noise maps. Embodiments of such systems described in context of specific terrains, noise maps, and gradients are but particular examples of contemplated systems chosen as being convenient illustrative examples of disclosed principles. One or more of the disclosed principles can be incorporated in various other graphical systems to achieve any of a variety of corresponding system characteristics.

Thus, systems and associated techniques having attributes that are different from those specific examples discussed herein can embody one or more presently disclosed innovative principles, and can be used in applications not described herein in detail, for example, in rendering special effects for film, or procedurally generating simulations of other random or pseudo-random phenomena. Accordingly, such alternative embodiments can also fall within the scope of this disclosure.

I. Overview

This disclosure concerns systems for procedurally generating maps of artificial terrain from noise maps, and associated techniques. Some noise maps have upper and lower bounds, and some disclosed approaches for generating artificial terrain maps from terrain-specific tiles, as described in Section II, below, take advantage of the fixed range by defining a plurality of bands of noise within the map.

Each band can be assigned to a corresponding terrain type. Section III builds on the disclosure in Section II and concerns applying a tile (or a portion thereof) from another noise map or a gradient to the base noise map described in Section II by scaling the other noise map or gradient to "fit" within a corresponding band in the first noise map. Such scaling allows another noise map or gradient to be used without a loss in resolution.

Section IV describes applying the foregoing approaches to generating a nearly infinite artificial terrain in a computationally and memory efficient manner.

Related aspects also are disclosed. For example, the following describes machine-readable media containing instructions that, when executed, cause a processor of, e.g., a computing environment, to perform disclosed methods. Such instructions can be embedded in software, firmware, or hardware. In addition, disclosed methods and techniques can be carried out in a variety of forms of signal processor, again, in software, firmware, or hardware.

Additional details of disclosed terrain mapping systems and associated techniques and methods follow.

II. Noise Map Bands

As noted above and shown schematically in FIGS. 1 and 2, a noise map 1 can include a two-dimensional array of randomly or pseudo-randomly varying numbers. Although a given noise map can have any upper or lower bound on values, the remainder of this disclosure will refer to noise maps populated with floating-point values ranging from −1.0 to +1.0, for convenience.

Figure 2:
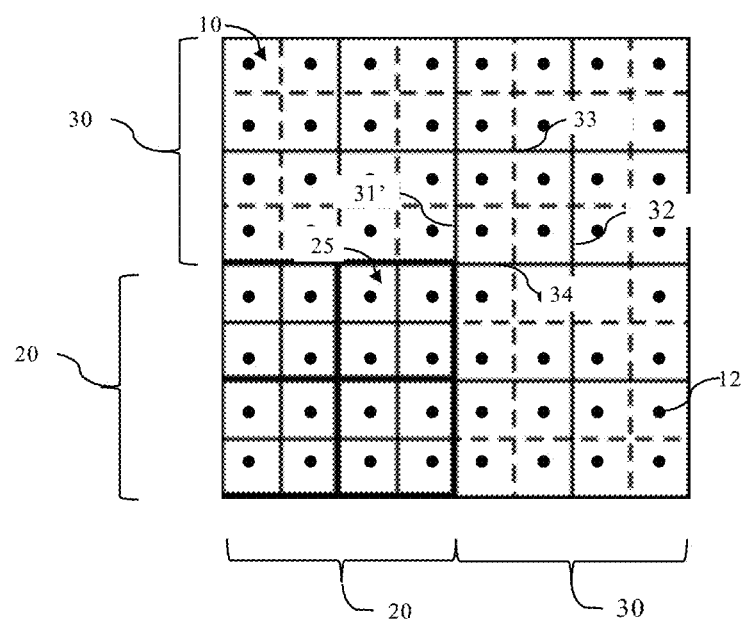
FIG. 2 illustrates a portion of the noise map shown in FIG. 1.

For example, each cell 10 in the grid depicted in FIGS. 1 and 2 can reflect a physical region corresponding to each noise-map sample. The cells 10 in FIG. 2 can be populated with measures of noise from any suitable noise source, and a selected number of bands, or sub-ranges, of noise can be defined.

Figure 3:
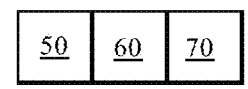
FIG. 3 schematically illustrates several bands within a range of noise.

The number of bands can be selected based on, for example, a desired number of terrains to be used in a map. For example, a selection map used to select from among water, dirt and forest can be divided into three bands. The bands can be equal in measure, as shown in FIG. 3, or the bands can differ in measure. For example, for noise ranging between −1.0 and +1.0 and three bands 50, 60, 70 of equal measure as in FIG. 3, each band has a width of ⅔ (~0.66667, to 5 decimals).

Three bands of unequal measure can be defined according to any desired proportions. As but one example, a first band could range from −1.0 to −0.5, a second band could range from −0.5 to +0.1, and a third band could range from +0.1 to +1.0.

Figure 4:
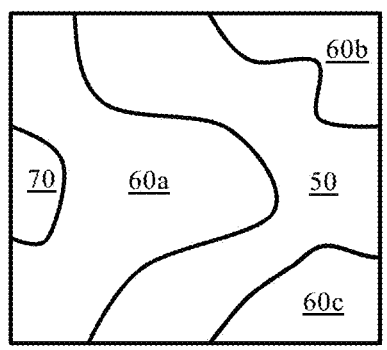
FIG. 4 illustrates an exemplary noise map including contours of the noise bands shown in FIG. 3.

FIG. 4 schematically illustrates the three bands 50, 60, 70 of noise applied to a particular two-dimensional noise map. The contours in FIG. 4 illustrate boundaries between adjacent bands. In the example, the region labeled 50 has values between −1.0 and −0.33333, the regions labeled 60a, 60b, 60c have values between −0.33333 and +0.33333, and the region labeled 70 has values between +0.33333 and +1.0. As shown, a two-dimensional selection noise map can have related bands spaced apart from each other, denoted by the areas 60a, 60b, 60c.

Figure 5:
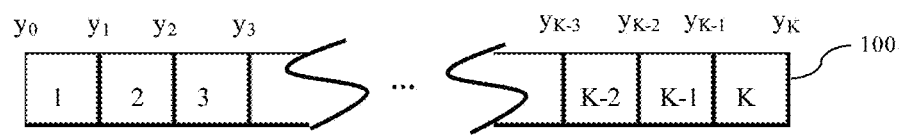
FIG. 5 illustrates a generalization of noise bands within a range of noise.

As FIG. 5 indicates, a given noise map can have any desired number of bands, K. In general, each band, k, in a noise map ranges in value from a lower bound, $y_{k-1}$, to a corresponding upper bound, $y_k$. For K equally sized bands in a noise map ranging from a lower bound $y_0$ to an upper bound $y_K$, each band will have a width of $(y_K - y_0)/K$.

The number of bands, K, can be equal to a number of terrain types desired for a terrain map, and can be selectable. For example, a framework-level process can receive the number of terrain types a desired map as input, and divide the noise map range into a corresponding number of sub-regions, or bands.

The resulting bands can, but need not, be uniformly distributed throughout the range of the selection noise map. For example, procedural rules can define other arrangements of bands within the selection noise map, such as, if a desired terrain map ought to have twice as much land as water. In that case, a combined width of bands corresponding to land-type terrains can be twice as wide as a combined width of bands corresponding to water-type terrain (assuming the selection noise map has an even distribution of values throughout the range). Alternatively, if bands of equal measure are defined, a selected noise map function can be used to generate twice as many values within bands corresponding to land-type terrain as compared to values within bands corresponding to water-type terrain.

III. Band-Wise Terrain Generation with Tiles

To generate a 2-D terrain map, each of a plurality of terrain representations can be assigned to correspond to one of a corresponding plurality of bands. For example, "water" depicted in FIG. 6 can be assigned to correspond to band 50, "dirt" depicted in FIG. 7 can be assigned to correspond to band 60, and "forest" depicted in FIG. 8 can be assigned to band 70, to generate the terrain map shown by way of example in FIG. 9. The "dirt" depicted in FIG. 7 is generated from non-coherent noise, but use of coherent noise for component noise maps is contemplated.

Figure 10:
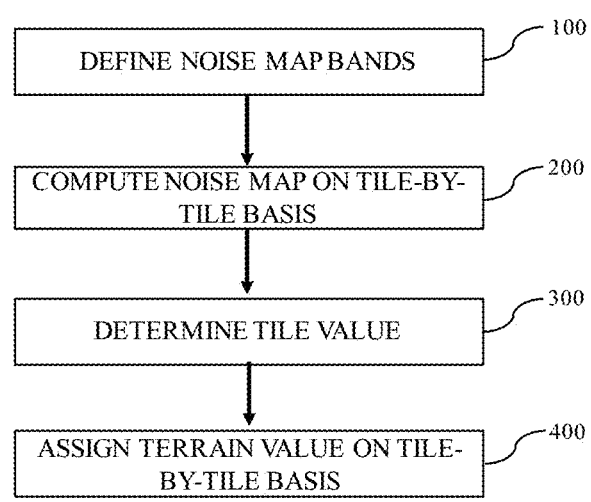
FIG. 10 illustrates an exemplary process for generating artificial terrain.

More generally, a plurality of tile maps or colors, each representing a given terrain type, can be received as an input from a data store. And, each band can be established, as indicated at block 100 in FIG. 10. The following table shows but one example of various bands corresponding to a various terrain types, or colors:

| Noise band index | Noise band | Terrain type/color |
|---|---|---|
| 1 | $y_0$-$y_1$ | Deep water |
| 2 | $y_1$-$y_2$ | Shallow water |
| 3 | $y_2$-$y_3$ | Surf |
| . | . | . |
| . | . | . |
| . | . | . |
| K-1 | $y_{K-2}$-$y_{K-1}$ | Mountain slopes |
| K | $y_{K-1}$-$y_K$ | Mountain peaks |

Referring again to FIG. 10, a selection noise map 1 (FIG. 1) can be computed on a tile-by-tile basis, at 200. For example, the noise map 1 can be computed in groups of four cells 10 corresponding to a given tile (e.g., tile bounded by edges 21', 22', 23', 24'). A size of the 2-D tiles can be selectable.

At 300, the noise map can be sampled at one or more positions 10 within each tile and the samples can be averaged or otherwise combined to determine a noise value for each respective tile. The number of samples per tile can vary and be selectable, as at the time of compiling the terrain generator.

In a working embodiment, the tile size can be selected by way of an API exposed to developers. As a consequence, the underlying code can adjust a sampling of an input noise map and adjust the 2-D tile generation in a corresponding fashion to balance, for example, desired resolution of each tile against computational overhead. For a given number of samples per tile, relatively larger tiles will generate a lower sampling density per area, generating a coarser, or more "zoomed-in," appearance in a rendered terrain map. Alternatively, relatively smaller tiles have a greater density of samples per unit area, and give a smoother, or "zoomed-out," appearance, given the same number of samples per tile.

At 400, a terrain value can be assigned to each tile based on, for example, the band in which the tile value falls, as indicated in the table and discussion above. If the tile value falls directly on a partition between bands, a developer can select an approach for biasing the result toward one band or the other. The result can be an organic, realistic-looking procedurally-generated 2-D game world.

Figure 6:
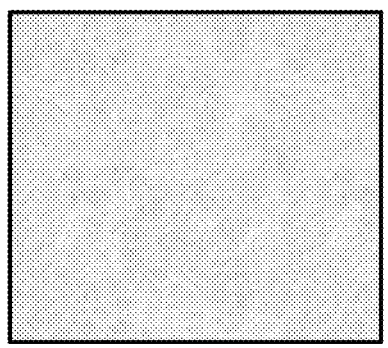
FIGS. 6, 7 and 8 illustrate component terrain maps.
Figure 7:
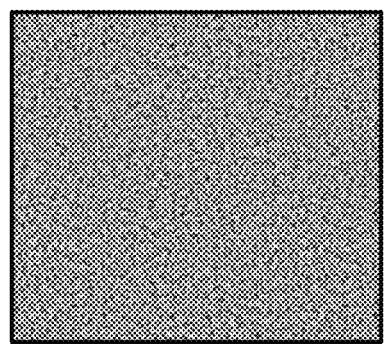
Figure 8:
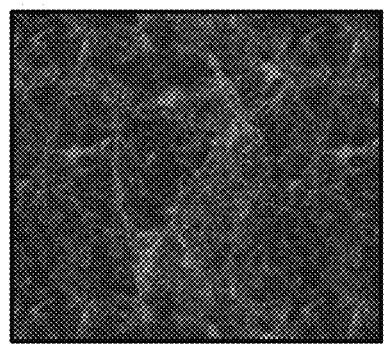
Figure 9:
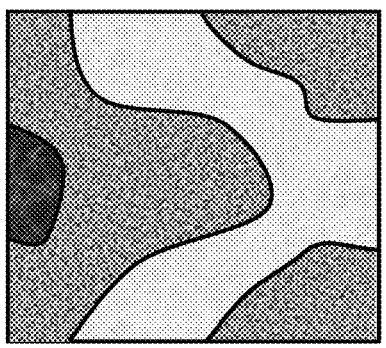
FIG. 9 illustrates the component terrains from FIGS. 6, 7, and 8 applied to the noise map shown in FIG. 4.

As an expedient, each terrain depicted in FIGS. 6, 7 and 8 can be composed of a respective mosaic of tiles, and each respective mosaic can correspond in size to a rendered size of the selection noise map shown in FIGS. 4 and 9. By having the tile mosaic and the selection noise map be the same size, each tile in the selection noise map can have a corresponding tile having the same coordinates within a terrain mosaic. Accordingly, little additional computational overhead is necessary to select a given tile from a selected terrain mosaic and to render the tile in the composite terrain map.

After assigning a tile value to a given tile in a composite terrain map based on sampled noise at one or more positions within a corresponding tile of a selection noise map, a terrain type (e.g., water, dirt, forest) can be selected for the tile in correspondence with the band of noise in which the tile falls. Within the mosaic of that terrain type, a single tile (or a plurality of tiles) can be selected to correspond to the tile in the selection noise map and placed in the composite terrain map (sometimes referred to as a composite mosaic) based on, for example, relative position of the tiles as between the selection noise map (or the composite mosaic) and the mosaic of the given terrain representation.

III. Band-Wise Terrain Generation with Gradients or Other Noise Maps

Other approaches are available for assigning terrain to a tile within a composite terrain map based on the tile's value derived from one or more samples of noise. For example, a representation of a given terrain type need not be a tiled mosaic. Rather, a given terrain type can be represented by a component gradient, a component noise map, or other function. Nonetheless, each such component gradient, noise map, or other function can be divided into tiles, each corresponding to a given tile in a selection noise map based on, for example, relative position. Each gradient, noise map, or other function can be discrete or continuous. Moreover, each component gradient, noise map, or other function can be scaled to correspond to a given noise band with which it is associated.

Figure 11:
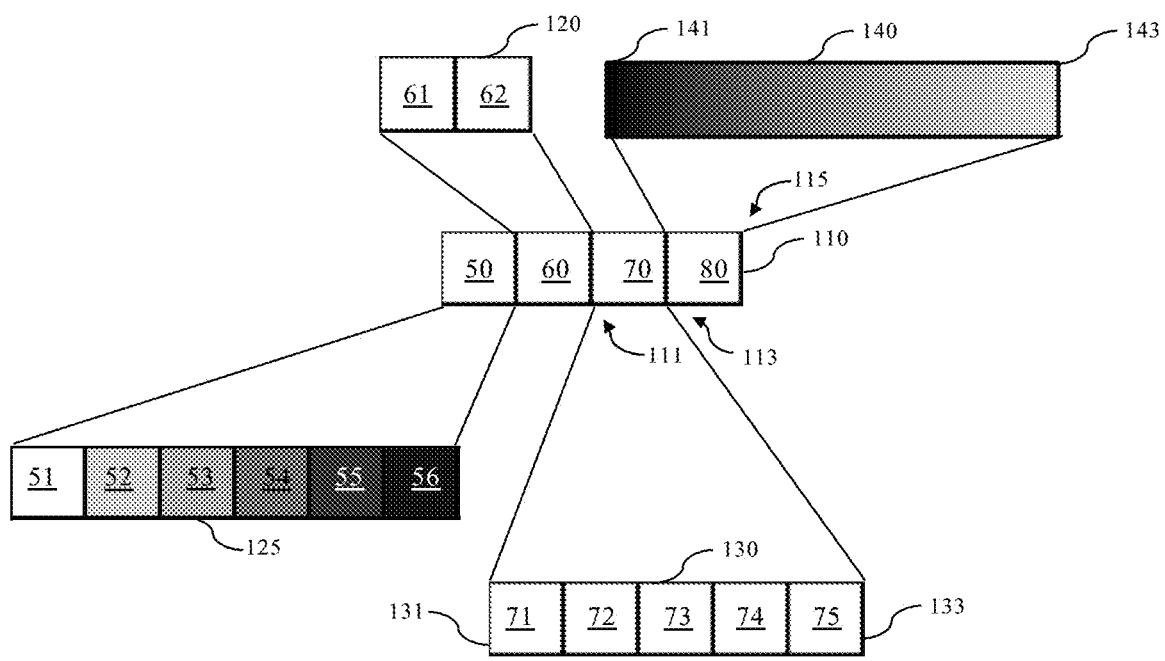
FIG. 11 schematically illustrates a plurality of discrete and continuous component terrains compressed into a corresponding plurality of noise bands.

FIG. 11 illustrates a schematic example of an approach for scaling several discrete terrain representations 120, 125, 130 and a continuous gradient representation 140 of another terrain to a group 110 of respective noise bands 50, 60, 70, 80. Framework-level compositing of any number of noise maps into a single, layered noise map, as illustrated in FIG. 11, can preserve each terrain's gradient colors and relative positions.

For example, each component gradient, noise map, or other function can be scale-compressed and/or value shifted to fit into a corresponding band. Consequently, a group of component gradients, noise maps, and/or other functions can be selected for a given application, and the selected gradients noise maps, and/or other functions can be combined into a single composite terrain map based a single selection noise map while maintaining the resolution of the original components.

Referring again to FIG. 11, a simple terrain representation 120, for illustrative purposes, can be represented by two tiles (or partitions) 61, 62. The terrain representation 120 can be scaled to a selected noise band, in this instance noise band 60. Accordingly, if a tile of a selection noise map has a value within the band 60, disclosed techniques will select from the terrain representation 120. However, that selection can be refined. Accordingly, if the value of the tile in the selection noise map falls in the lower half of the noise band 60, the tile 61 from the representation 120 can be applied to the tile of the composite map. Alternatively, if the value falls in the upper half of the noise band 60, the tile 62 can be applied in the composite map. If the value of the tile in the selection noise map falls on the midpoint of the noise band 60, either tile 61, 62 can be selected according to a developer's preference for biasing the terrain 120.

For illustrative purposes, the terrain representation 120 was assumed to have an equal distribution of partitions therein. However, the terrain representation can have a linear or a non-linear distribution of partition ranges scaled to the respective band. For example, the tile 61 (and thus the tile 62) can be applied to a sub-band of more or less than 50% of the noise band 60. Alternatively, the tile 61 can be applied to one or more different sub-bands within the band 60, and the sum of those sub bands can be more or less than 50% of the band 60. As but one particular example chosen for illustrative purposes, the tile 61 can be applied to 40% of the band 60, as follows: (1) lowest 10% (i.e., 0 to 10% of the band 60; and (2) middle 30% (i.e., 35% to 65%) of the band 60.

More generally, referring now to the terrain representation 130, a given terrain representation can be scaled to fit within a selected noise band 70. A lower bound 131 of the terrain representation can be made to correspond to a lower bound 111 of the band 70. Similarly, an upper bound 133 of the terrain representation can be made to correspond to an upper bound 113 of the band 70.

A value of each partition in the terrain representation (e.g., a boundary between partitions 72 and 73) can be scaled to a value within the range 110 of the selection noise map based on the boundary's position between the lower and upper bounds 131, 133 of the terrain representation. Similarly, a continuous function (e.g., a gradient 140) having a finite range (e.g. between lower bound 141 and upper bound 143) can be scaled to a given noise band.

For example, a position of a given partition or value in a continuous function (e.g., a gradient 140) can be computed based on linear scaling using the following equation:

$$G_{k,n} = \left(\frac{y_n - y_{k-1}}{y_k - y_{k-1}}\right)(G_{k,H} - G_{k,L}) + G_{k,L}$$

where, $G_{k,n}$ is the computed terrain value within a given noise band, k;

$y_n$ is a tile value (value of noise for a given tile within the selection noise map);

$y_{k-1}$ is the specified lower bound of the given noise band, k;

$y_k$ is the specified upper bound of the given noise band, k;

$G_{k,H}$ is the upper bound of the range for the component gradient, noise map, or other function; and $G_{k,L}$ is the lower bound of the range for the component gradient, noise map, or other function.

Although a linear scaling was described above, non-linear scaling approaches can be applied to achieve a desired result.

IV. Memory Efficient Storage of Composite Terrain Map

Terrain maps generated as described above, and using one or more other approaches, can be stored efficiently and rendered on an as-needed basis. For example, a region of a terrain map to be loaded into active memory can correspond to a visible region determined based on, for example, display size and resolution.

Figure 12:
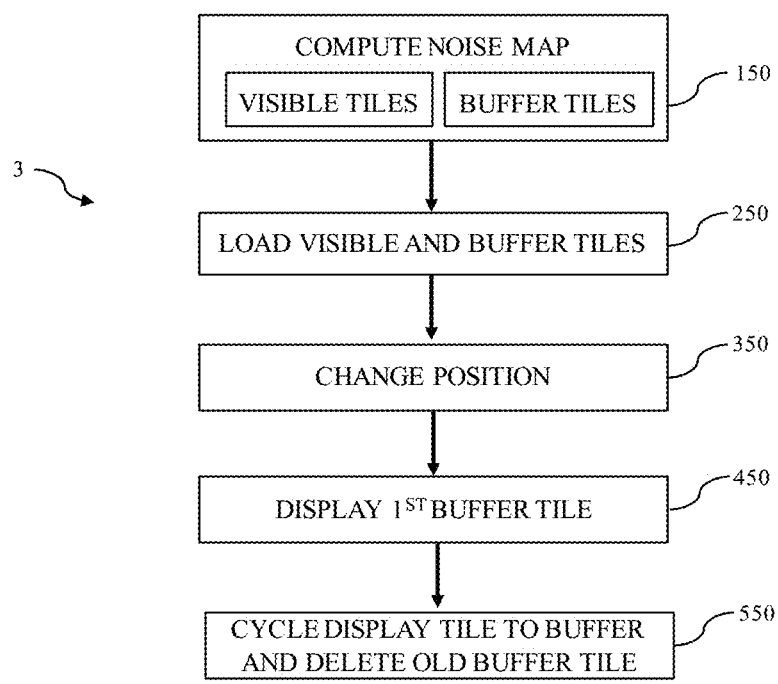
FIG. 12 illustrates an exemplary process for efficiently displaying an artificial terrain.

FIG. 1 shows such a region of a selection noise map 1 that can be used to generate a corresponding terrain map on an as-needed basis based on the region currently being displayed. Accordingly, as indicated in FIG. 12 at 150, a portion of a selection noise map can be computed. At 250, a corresponding portion of the overall terrain map can be generated and/or loaded into active memory. The region of the selection noise map 1 can be divided between a visible region 20 and a buffer region 30. In FIG. 1, the visible region 20 is depicted in relatively heavier lines and is bounded by sides 21, 22, 23 and 24. The illustrated visible region has a plurality of tiles, each bounded by sides 21', 22', 23' and 24'. The illustrated buffer region 30 includes a selected number of tiles surrounding the visible region 20.

As noted above, each tile in the selection noise map 1 can have, by way of example only, four corresponding noise map regions (or cells) 10 that can be sampled to establish a value of the respective tile. A composite terrain map can be generated using any of the approaches described above (or another approach) for the visible region 20 and for the buffer region 30.

Referring to FIG. 12 at 350, a position on the terrain map can move. As an on-screen view of the composite terrain map moves, tile sub-regions stored in active memory can enter the visible region 20 from the buffer region 30 at 450. In addition, tiles in the buffer region that fall out of the buffer region can be deleted from active memory and tiles that enter the buffer region can be generated (and/or otherwise loaded) into active memory in anticipation of being displayed on-screen at 550. Such generation and/or loading can occur asynchronously.

As an example, an upper right corner of the selection noise map 1 is shown in FIG. 2. A portion of the visible region 20 and a portion of the buffer region 30 are shown. (Each circle 12 within the cells 10 represents a sampled position in the noise map.) The tile 25 represents an outermost extent of the visible region. If the terrain map translates diagonally down and left in FIG. 2, an outer most extent of the visible region 20 can move to the buffer tile bounded by 31', 32', 33', and 34'. New buffer tiles can be generated to fill regions of the buffer 30 vacated by movement of the terrain map, and buffer tiles that fall out of the buffer region (e.g., at a position opposite the tile 25) can be deleted from memory.

Consequently, an artificial terrain can be moved through efficiently by displaying regions on an as-needed basis without having to load an entire "game world" into memory at once. In addition, a terrain map generated and loaded as disclosed herein can be substantially larger than a map that would need to be loaded into memory in its entirety.

Stated differently, techniques described herein can reduce a memory footprint and conserve available memory compared to generating the entire terrain on game initiation. As well, disclosed techniques can reduce computational overhead to an "as-needed" basis (again, compared to generating the entire terrain on game initiation).

V. Terrain Generation Engines

Figure 13:
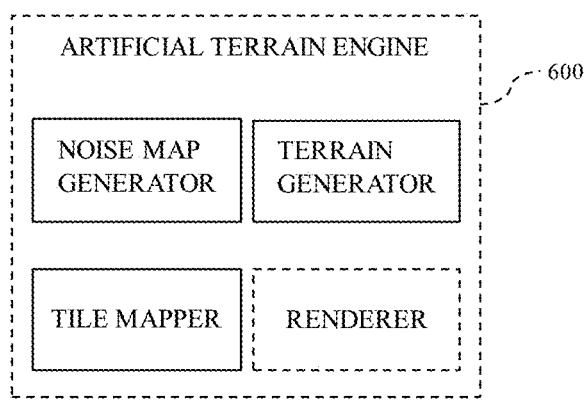
FIG. 13 illustrates a representative artificial terrain engine.

As FIG. 13 shows, an artificial terrain engine according to disclosed techniques can have a selection-noise-map generator configured to generate a selection noise map. A terrain generator can load or otherwise generate one or more component terrains as described above. A tile mapper can assign, for example, tiles from one or more of the component terrains based on, for example, a corresponding tile value in the selection noise map. Artificial terrain engines as described herein can include a renderer configured to render the terrain map on a display. The renderer can load visible tiles and buffer tiles into memory, and the buffer tiles can enter the visible region based on a user's activity, and the renderer can call on other modules in the artificial terrain engine to generate new terrain tiles in the buffer region in anticipation of displaying the newly generated buffer tiles in the visible region.

IX. Computing Environments

Figure 14:
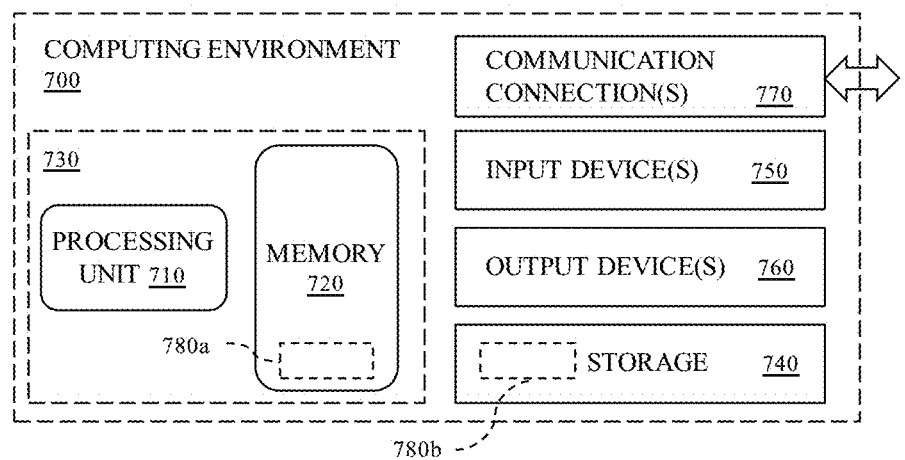
FIG. 14 illustrates a block diagram of a computing environment as disclosed herein.

FIG. 14 illustrates a generalized example of a suitable computing environment 700 in which described methods, embodiments, techniques, and technologies relating, for example, to procedurally generating an artificial terrain map. The computing environment 700 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 700 includes at least one central processing unit 710 and memory 720. In FIG. 14, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can run simultaneously. The memory 720 may be volatile memory (e.g., registers, cache, RAM), non-volatile memory (e.g., ROM, EEPROM, flash memory, etc.), or some combination of the two. The memory 720 stores software 780a that can, for example, implement one or more of the innovative technologies described herein, when executed by a processor.

A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The store 740 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 700. The storage 740 stores instructions for the software 780, which can implement technologies described herein.

The store 740 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 750 may be a touch input device, such as a keyboard, keypad, mouse, pen, touchscreen, touch pad, or trackball, a voice input device, a scanning device, or another device, that provides input to the computing environment 700. For audio, the input device(s) 750 may include a microphone or other transducer (e.g., a sound card or similar device that accepts audio input in analog or digital form), or a computer-readable media reader that provides audio samples to the computing environment 700.

The output device(s) 760 may be a display, printer, speaker transducer, DVD-writer, or another device that provides output from the computing environment 700.

The communication connection(s) 770 enable communication over a communication medium (e.g., a connecting network) to another computing entity. The communication medium conveys information such as computer-executable instructions, compressed graphics information, processed signal information (including processed audio signals), or other data in a modulated data signal.

Thus, disclosed computing environments are suitable for transforming an artificial terrain map as disclosed herein into a human-perceivable form. As well, or alternatively, disclosed computing environments are suitable for transforming an artificial terrain map as disclosed herein into a modulated signal and conveying the modulated signal over a communication connection Machine-readable media are any available media that can be accessed within a computing environment 700. By way of example, and not limitation, with the computing environment 700, machine-readable media include memory 720, storage 740, communication media (not shown), and combinations of any of the above. Tangible machine-readable (or computer-readable) media exclude transitory signals.

X. Other Embodiments

The examples described above generally concern apparatus, methods, and related systems for generating artificial terrain maps, and more particularly but not exclusively to deriving an artificial terrain map from a selection noise map. Nonetheless, embodiments other than those described above in detail are contemplated based on the principles disclosed herein, together with any attendant changes in configurations of the respective apparatus described herein.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of signal processing techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to generating an artificial terrain map. For example, modules identified as constituting a portion of a given computational engine in the above description or in the drawings can be partitioned differently than described herein, distributed among one or more modules, or omitted altogether. As well, such modules can be implemented as a portion of a different computational engine without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. A computationally efficient method of generating an artificial terrain map, the method comprising:
    selecting a plurality of terrain types and providing a component terrain for each of the terrain types, wherein each component terrain has a corresponding range of terrain values, wherein a terrain value within each respective range corresponds to a representation of the corresponding terrain type;
    computing a plurality of noise-map values within a region of a selection noise map, wherein a plurality of tiles corresponds to the region, and wherein the noise-map values range from a lower bound to an upper bound;

defining a plurality of noise bands within the range of noise-map values, wherein each respective noise band has a corresponding lower bound and a corresponding upper bound to define a range of noise-map values for the respective noise band;

assigning each noise band a corresponding component terrain;

determining a tile value for each tile based on one or more noise-map values within the respective tile;

assigning one of the noise bands to each respective tile such that the respective tile value falls within the range of the assigned noise band; and for each tile, determining a terrain value corresponding to the respective tile value based on a relationship between the range of the terrain values of the corresponding component terrain and the range of the noise band assigned to the respective tile, wherein, according to the relationship, the range of the terrain values is scaled to fit in the range of the noise band.

2. The method according to claim 1, wherein the component terrain comprises one of a gradient, another noise map, a partitioned terrain representation, and a color.

3. The method according to claim 2, wherein the component terrain further comprises a discrete function or a continuous function, and the respective function ranges between a lower bound and an upper bound, and wherein the method further comprises scaling the range of the respective function to match the range of the corresponding noise band.

4. The method according to claim 3, wherein the act of determining a terrain value for each tile comprises determining a value within the range of the respective function to correspond with the tile value within the range of the respective noise band.

5. The method according to claim 2, wherein the component terrain comprises a partitioned terrain representation comprising a plurality of tile partitions, wherein the method further comprises selecting a tile partition from a partitioned terrain representation according to the terrain value.

6. The method according to claim 5, wherein a position of the tile occupies a selected position within a terrain map, wherein the selected position within the terrain map corresponds to a position of the noise map tile within the noise map.

7. The method according to claim 1, wherein the act of determining a tile value for each tile comprises selecting a number of samples of the noise map within each tile, and wherein a noise-map tile size and the selected number of samples are each selectable.

8. The method according to claim 1, wherein the act of computing the plurality of noise-map values comprises computing one or more noise-map values for each tile within a selected visible region and for each tile within a selected buffer region positioned adjacent the selected visible region.

9. The method according to claim 1, wherein scaling the range of the terrain values to fit in the range of the noise band preserves a resolution of the range of the terrain values of the corresponding component terrain.

10. A computer system for generating an artificial terrain, the computer system comprising a processor and a memory containing instructions that, when executed by the processor, cause the computer system:

to generate one or more values of coherent noise within a given range on a tile-by-tile basis for a plurality of tiles;

to determine a noise value of each tile based on a selected number of noise samples from each tile;

to divide the range of the coherent noise into a selected plurality of noise bands, wherein each noise band corresponds to a selected component terrain and has a range extending from a lower threshold to an upper threshold, wherein each component terrain has a corresponding range of terrain values, wherein a first terrain value within each range of terrain values corresponds to a first representation of the respective component terrain and a second terrain value in the respective range corresponds to a second representation of the corresponding component terrain;

for each tile, to compute a terrain value corresponding to the noise value for the respective tile based on a relationship between the range of terrain values of the component terrain and the range of the corresponding noise band, wherein, according to the relationship, the range of the terrain values is scaled to fit in the range of the noise band; and to assign a terrain representation to each tile in correspondence with the terrain value for the respective tile.

11. The computer system according to claim 10, wherein the plurality of tiles comprises a first plurality of tiles corresponding to a display region and a second plurality of tiles corresponding to a buffer region positioned around an outer periphery of the display region.

12. The computer system according to claim 11, wherein the instructions, when executed by the processor, further cause the computer system to asynchronously load one or more of the second plurality of tiles corresponding to the buffer region into the memory to prepare to display the respective one or more of the second plurality of tiles.

13. The computer system according to claim 12, wherein the instructions, when executed by the processor, further cause the computer system to delete from the memory tiles that exit the buffer region.

14. The computer system according to claim 10, wherein the selected terrain comprises one of a gradient, a terrain representation partition, a color, and another noise map.

15. The computer system according to claim 14, wherein the terrain value comprises a gradient or another noise map, wherein the gradient or other noise map has a range between a lower bound and an upper bound, wherein each band has a lower bound and an upper bound, and wherein the instructions, when executed by the processor, further cause the computer system to scale the range of the gradient or other noise map to match the range of the corresponding noise band.

16. The computer system according to claim 15, wherein the instructions, when executed by the processor, further cause the computer system to determine a position within the range of the gradient or other noise map to correspond with a position of the tile value within the range of the respective noise band.

17. The computer system according to claim 10, wherein the terrain value comprises a terrain image.

18. A tangible, non-transitory computer-readable medium containing instructions that, when executed by a processor, cause the processor to perform a computationally efficient method of generating an artificial terrain map, the method comprising:

selecting a plurality of terrain types and providing a component terrain for each of the terrain types, wherein each component terrain has a corresponding range of terrain values, wherein each terrain value within each respective range corresponds to a respective representation of the corresponding terrain type;

computing a plurality of noise-map values for a region of a selection noise map having a plurality of tiles on a tile-by-tile basis, wherein the selection noise map has values ranging from a lower bound to an upper bound;

defining a plurality of noise bands within the range of selection-noise-map values and assigning each terrain type to a corresponding noise band, wherein each respective noise band has a corresponding range from a lower bound to an upper bound;

determining a tile value for each tile based on one or more selected values of the noise map within the respective tile;

assigning each respective tile to one of the noise bands such that the tile value falls within the range of the assigned noise band; and assigning a terrain value to each respective tile in the selection noise map based on a relationship between the range of the noise band assigned to the respective tile and the range of the corresponding component terrain, wherein, according to the relationship, the range of the terrain values is scaled to fit in the range of the noise band.

19. The computer-readable medium according to claim 18, wherein the component terrain comprises one of a gradient, another noise map, a terrain representation partition, and a color.

20. The computer-readable medium according to claim 19, wherein the component terrain further comprises a discrete function or a continuous function, and the respective function ranges between a lower bound and an upper bound, and wherein the method further comprises scaling the range of the respective function to match the range of the corresponding band.

21. The computer-readable medium according to claim 20, wherein the act of assigning a terrain value to the noise-map tile comprises determining a value within the range of the respective function to correspond with the tile value within the range of the respective noise band.

* * * * *